UNITED STATES PATENT OFFICE.

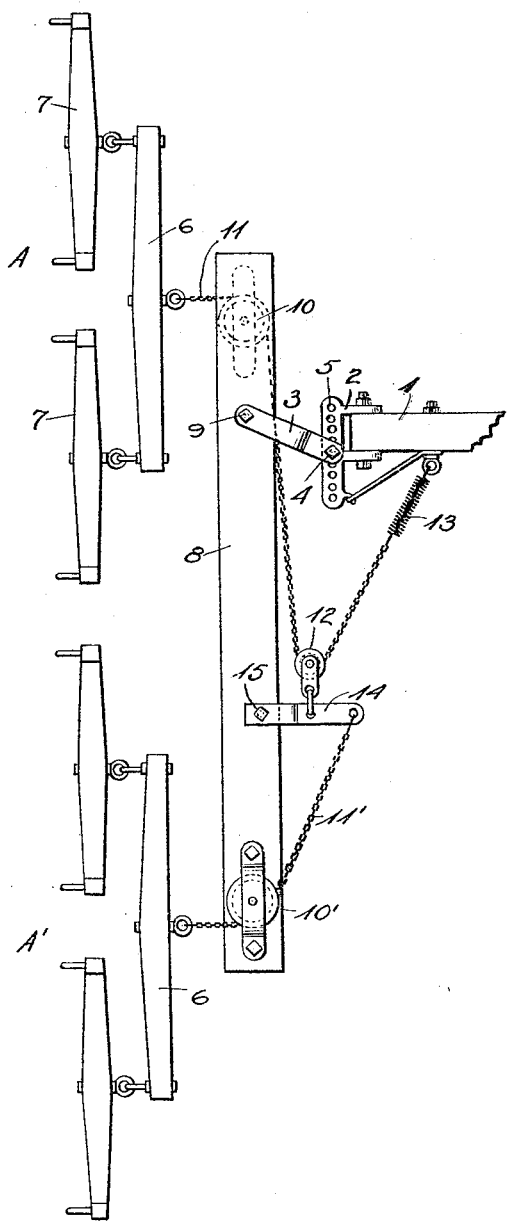

JOHN LEWIS KLAGES, OF ROCKFORD, IOWA.

DRAFT-EQUALIZER.

1,122,949.  Specification of Letters Patent.  Patented Dec. 29, 1914.

Application filed September 30, 1914. Serial No. 864,246.

*To all whom it may concern:*

Be it known that I, JOHN L. KLAGES, a citizen of the United States, and a resident of Rockford, in the county of Floyd and State of Iowa, have invented a new and Improved Draft-Equalizer, of which the following is a full, clear, and exact description.

This invention relates to draft appliances for plows and other loads, and has to deal more especially with equalizers of that type having a plurality of draft appliances attached through an evener and accompanying means with the load to be drawn.

The invention has for its general objects to improve the construction and operation of draft equalizers so as to be reliable and efficient in use, comparatively simple and inexpensive to manufacture and so designed that an effective equalizing action between the various teams of draft animals may be obtained.

A further object of the invention is the provision of a draft equalizer of that type in which the evener is connected at a point at one side of the center to the load to be drawn, and the draft devices are provided with flexible elements which pass over pulleys on the ends of the evener, and one flexible element is connected with a swinging lever mounted on the evener at the side of the center opposite the point of attachment of the load, and the other flexible element passes around a pulley on the swinging lever and is connected with the load.

With such objects in view, and others which will appear as the description proceeds, the invention comprises various novel features of construction and arrangement of parts which will be set forth with particularity in the following description and claims appended hereto.

In the accompanying drawing, which illustrates one embodiment of the invention, the figure is a plan view of the draft equalizer shown as a double team appliance for plows or other loads.

Referring to the drawing, 1 designates the forward end of a plow beam which has a suitable clevis bracket 2 to which the clevis or link device 3 is adjustably and hingedly connected by a pin or bolt 4 passing through any one of a series of openings 5 in the device 2.

A and A' are ordinary draft devices shown as double trees 6 and swingletrees 7, and the equalizing means between the draft devices and the load 1 includes an evener bar 8 to which the clevis 3 is connected by a pin or bolt 9, the latter being almost in front of the load 1 and to one side of the center of the evener 8. On the evener adjacent the ends thereof are pulleys 10 and 10' over which pass flexible elements 11, 11', respectively, which elements are respectively connected with the centers of the double trees 6 of the draft devices A and A'. The flexible element 11 extends from the pulley 10 transversely to the clevis 3 to a point beyond the center of the evener 8, where it passes around the pulley or guide 12 and thence continues backwardly toward the load, where it is connected through a jar take-up spring or cushioning device 13 with the plow beam at a point to the rear of the clevis 3.

The pulley or guide 12 is connected with a swinging lever or arm 14 extending rearwardly from and pivotally mounted on the evener 8 at a point to the opposite side of the center from the clevis 3. The other flexible element 11' has its rear end connected with this swinging arm 14, so that when there is an unequal pull on the draft devices A and A', the lever 14 will swing on its pivot 15 and cause a compensation of the pull between the draft devices. Obviously the evener 8 also acts as a compensator by its being free to swing.

From the foregoing description taken in connection with the accompanying drawing, the advantages of the construction and method of operation will be readily understood by those skilled in the art to which the invention appertains, and while I have described the principle of operation, together with the appliance which I now consider to be the best embodiment thereof, I desire to have it understood that the appliance shown is merely illustrative and that such changes may be made when desired as fall within the scope of the appended claims.

Having thus described my invention, I claim as new and desire to secure by Letters Patent:

1. A draft equalizer comprising a load to be drawn, an evener bar, a connection between the load and evener bar to one side of the center of the latter, draft devices at the ends of the evener bar, a movable member connected with the evener bar at the opposite side of the center from the said connection, means for connecting one of the draft devices with the said member and engaged with the evener bar adjacent one end, and means engaged with the evener bar at the opposite end and connected with the other draft device and movably connected with said member and also connected with the load.

2. A draft equalizer comprising a load to be drawn, an evener bar, a connecting element hingedly connected with the load and hingedly connected with the evener bar at a point between the center and one end, draft devices at the ends of the evener bar, a flexible element connected with each draft device, guides on the evener bar on which the flexible elements move, a member provided on the evener bar at the side of the center opposite from the said connecting element and to which one of the flexible elements is connected, a guide on the member around which the other flexible element movably passes, and means for connecting such element to the load.

3. The combination of a load, an evener bar, a clevis device connecting the bar with the load, pulleys on the ends of the evener bar, draft devices, flexible elements connected with the draft devices and passing respectively around the pulleys to the rear of the evener bar, a rearwardly-extending swinging member on the evener bar and to which the end of one of the flexible elements is fastened, a pulley on the said member and around which the other flexible element passes, and a yielding shock absorbing means connected with the end of such other element and connected with the load.

In testimony whereof I have signed my name to this specification in the presence of two subscribing witnesses.

JOHN LEWIS KLAGES.

Witnesses:
  E. L. WALLESER,
  F. M. WOATKE.

Copies of this patent may be obtained for five cents each, by addressing the "Commissioner of Patents, Washington, D. C."